Aug. 18, 1964   F. W. KRUSE, JR., ET AL   3,145,351
SYSTEM FOR MODULATING POWER LEVEL OF MICROWAVE OSCILLATORS
Filed Aug. 27, 1962                                          2 Sheets-Sheet 1
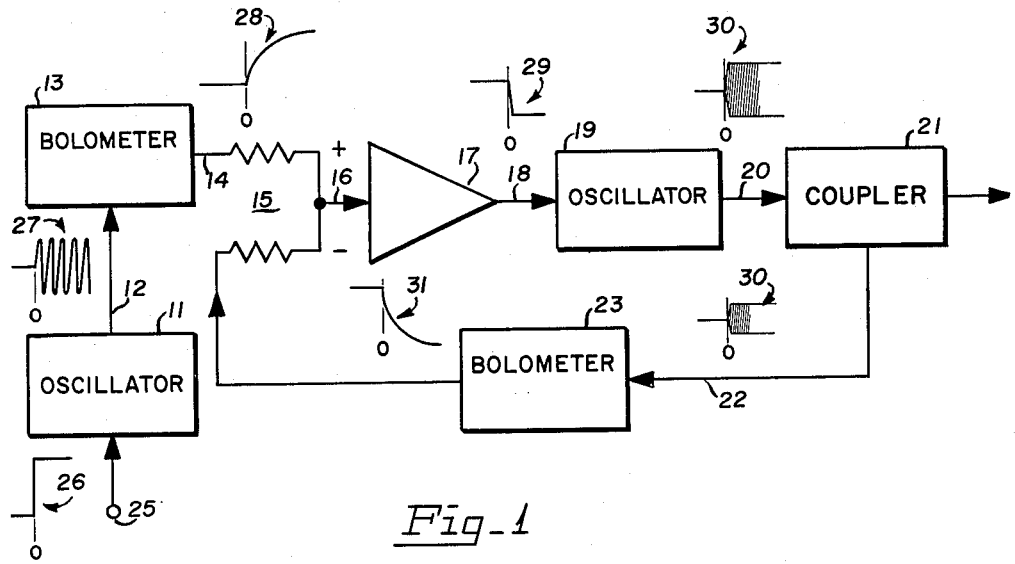
Fig_1
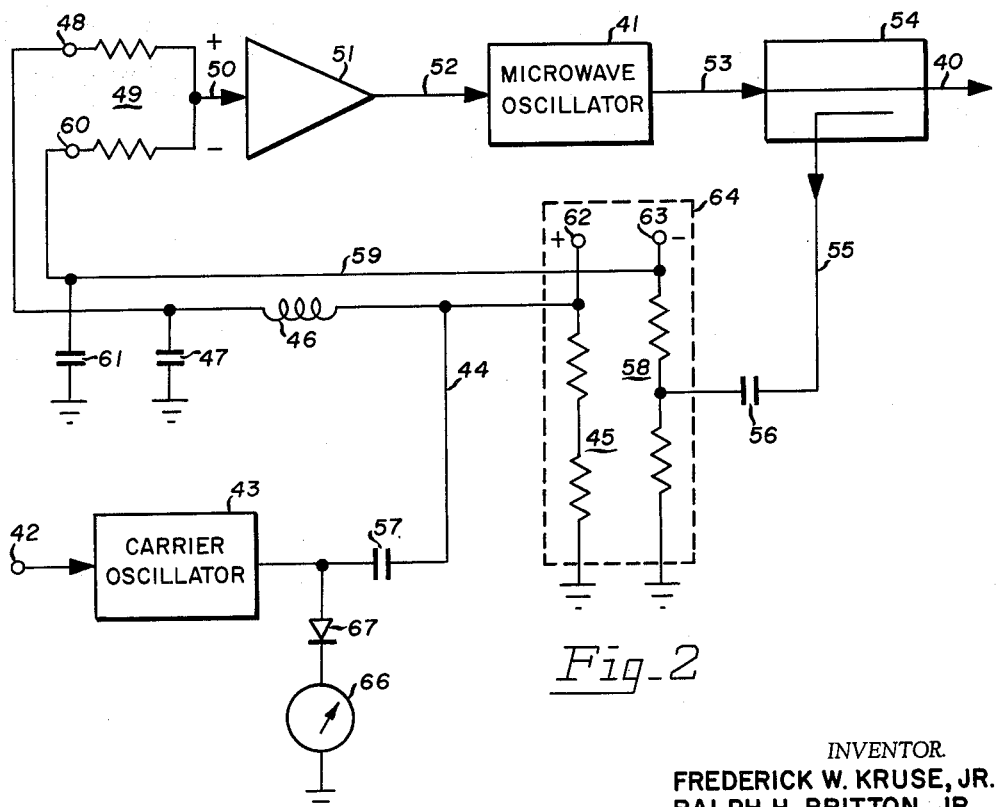
Fig_2
INVENTOR.
FREDERICK W. KRUSE, JR.
RALPH H. BRITTON, JR.
BY
ATTORNEY

INVENTOR.
FREDERICK W. KRUSE, JR.
RALPH H. BRITTON, JR.
BY
ATTORNEY

United States Patent Office 3,145,351
Patented Aug. 18, 1964

3,145,351
SYSTEM FOR MODULATING POWER LEVEL OF MICROWAVE OSCILLATORS
Frederick W. Kruse, Jr., and Ralph H. Britton, Jr., Palo Alto, Calif., assignors to Alfred Electronics, Palo Alto, Calif., a corporation of California
Filed Aug. 27, 1962, Ser. No. 219,678
14 Claims. (Cl. 332—39)

This invention relates to a system and method for modulating and measuring microwave frequency power levels and more particularly to a servomechanism type system and method capable of substantially instantaneously and precisely varying or measuring the power level of the output power of microwave tubes.

Controlling or modulating the output power level of microwave oscillators, utilizing feedback techniques, are well-known to those skilled in the art. Such systems generally include a very high-gain amplifier having the control or modulating signal applied thereto through a suitable summing network. The output signal of the amplifier is applied directly to the amplitude control terminal of the microwave oscillator which in response thereto provides a microwave signal whose output power level is proportional to the amplifier output signal.

A small fixed portion of the output power developed by the microwave oscillator is diverted to a transducer capable of developing a D.C. output voltage whose amplitude is proportional to the microwave oscillator output power level. The transducer generated output voltage, also referred to as the feedback signal, is applied to the summing network which develops an error signal equal to the difference between the control or modulating signal and the feedback signal.

A commonly used transducer for converting microwave output power to a D.C. output voltage is the crystal detector. Crystal detectors have the advantage of providing a substantially instantaneous D.C. output voltage because they have time constants of the order of 0.1 microsecond, assuring that the microwave oscillator output power follows the applied control signal almost instantaneously. Crystal detectors, however, have certain limitations which often outweigh the advantage of instantaneous response. For example, crystal detectors have to be carefully matched to the sampling line or else their response becomes frequency dependent. Furthermore, the detection characteristics vary considerably from crystal to crystal so that on replacement of the crystal, recalibration of the sensitivity over the entire operating frequency range becomes necessary. Also, crystals have a tendency of changing their detection characteristics with aging, requiring frequent recalibration.

To overcome the limitation of crystal detectors, use has been made of transducers utilizing the temperature coefficient of resistivity of resistance elements such as bolometers. While bolometers have been found to overcome most of the above enumerated limitations, their response is relatively slow with time constants of the order of 100 microseconds. This makes the response of bolometers approximately 1000 times slower in time than that of a crystal.

As a consequence of the slow response of bolometers, the control or modulating signal applied to the summing network causes violent overshoots and thereby very large momentary amplitudes of the microwave output power since the feedback signal, developed by a slow transducer, requires a comparative long time to come up to full amplitude to decrease or reduce the error signal to zero. To prevent such waveform distortion only low frequency modulating signals are usable with such systems.

It is therefore a primary object of this invention to provide a system and a method for modulating the power output of microwave oscillators which system and method has a fast response, is substantially independent of frequency, and has substantial freedom from overshoot and distortion.

It is a further object of this invention to provide a modulating system for microwave oscillators capable of instantaneously following an applied modulating signal in the video frequency range without overshoot utilizing a slow response transducer.

It is another object of this invention to provide a means and a method for measuring the output power from a microwave device which is substantially instantaneous, is flat over an extended range of frequencies, and allows the measurement of modulating pulses having rise and fall times of less than one-tenth of a microsecond.

It is a still further object of this invention to provide an improved means and method for modulating or otherwise controlling, or of measuring the output power delivered by microwave oscillators.

It is still a further object of this invention to provide a reliable, inexpensive, and efficient means and method for modulating and for measuring the output power of microwave tubes utilizing a pair of matched bolometers kept at a negligible temperature difference.

Briefly, the system comprises a wideband high-gain amplifier whose output signal is applied, as an amplitude control signal, between the grid and cathode of a microwave oscillator for beam density control. The microwave output power from the oscillator is passed through a coupler which diverts a small known fraction of the output power to a first bolometer which develops a feedback signal in the form of a D.C. output voltage which is proportional to the envelope of the sampled microwave output power. A second bolometer is provided which has the identical or matched characteristics as the first bolometer, and which is encapsuled side by side with the first bolometer so that both are, at all times, exposed to the same ambient temperature.

A fixed frequency oscillator, providing a carrier signal which is readily modulated by a modulating signal, is connected to apply the modulated carrier signal directly to the second bolometer which develops a D.C. output voltage corresponding to the amplitude of the applied control signal. The output voltages of both bolometers are applied to a summing network which computes their amplitude difference and applies this difference signal directly to the negative feedback amplifier controlling the beam density of a microwave oscillator.

Because the bolometers are selected to have the same transfer characteristic so that the modulating signal, prior to its application to the microwave oscillator, is applied to a transducer having the same time constant as the transducer developing the feedback signal, the response is instantaneous and the time constant of the transducer in the feedback loop does not appreciably affect the response of the system.

The high-gain of the feedback loop, principally provided by the wideband amplifier, proportionally reduces the time constant of the bolometer transducer. Sufficiently high loop gain reduces the time response of the loop to a negligible value which is only limited by noise and loop stability considerations.

Other objects and a better understanding of the invention may be had by reference to the following description, taken in conjunction with the accompanying drawings, in which:

FIG. 1 is a general schematic block diagram of the control system and method of this invention;

FIG. 2 is a schematic circuit diagram, partially in block form, for modulating the microwave oscillator;

Figure 3:
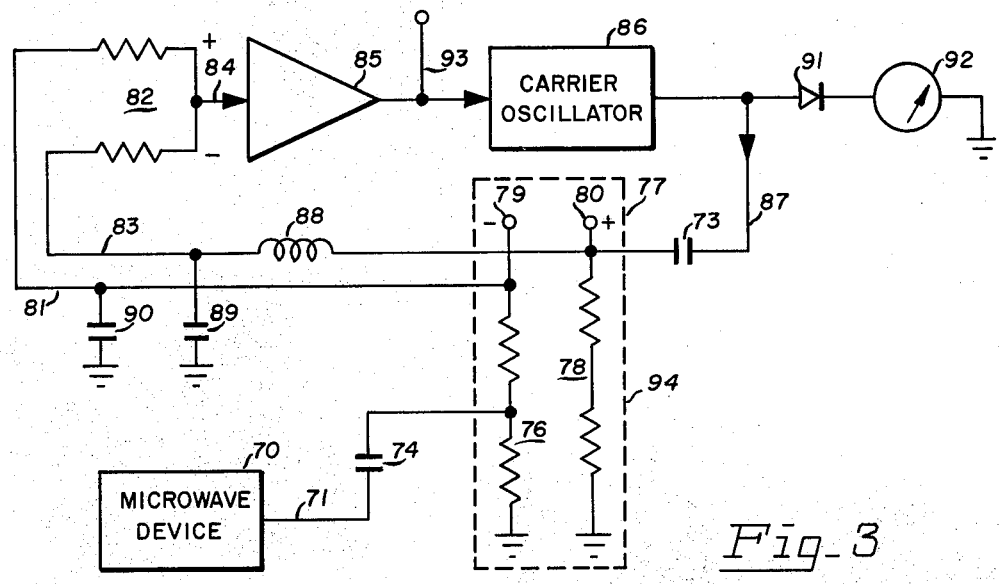
FIG. 3 is a schematic circuit diagram, partially in block form, for measuring the output power and for observing output power modulation.

Referring now to the drawings, and particularly to FIG. 1 thereof, there is shown the system and method for controlling or measuring the amplitude of the power level of the output power of a microwave oscillator in accordance with this invention. Basically, the system comprises a first externally modulated oscillator 11 connected by a lead 12 to a first bolometer transducer 13. The term bolometer or bolometer transducer as used herein includes barreters, thermistors, and any other device utilizing the temperature coefficient of resistivity of some resistance element.

Output conductor 14 of bolometer 13 is applied to a conventional summing network generally designated by reference characters 15 having an output conductor 16 connected to a wideband (also known as video) high-gain amplifier 17. Output conductor 18 from amplifier 17 is applied to the output power control terminal of a second externally modulated oscillator 19 which provides an output signal on a conductor 20 having an amplitude corresponding to the amplitude of the signal on lead 18. Output conductor 20 is connected, via a coupler device 21, to conductor 22 which forms a portion of a feedback loop. A second bolometer transducer 23 is connected between feedback conductor 22 and summing network 15.

The system shown in FIG. 1 may be operated as a leveller or modulating system for controlling the output power level of microwave devices as will be explained in detail in connection with the description of FIG. 2. When so operated, the output power level can be conveniently measured and the modulation envelope observed. With slight modification, the system of FIG. 1, as will be explained in detail in connection with the description of FIG. 3, may also be operated to measure, observe, and otherwise determine the output power level and modulation of any microwave source.

An understanding of either of these modes of operation may be had by considering the combined effect of bolometers 13 and 23 upon the system when utilizing the system for modulating the output power of a microwave oscillator. For this mode of operation, externally modulated oscillator 19 may take the form of a conventional backward travelling wave tube oscillator or any other microwave device such as a klystron and externally modulated oscillator 11 is selected to provide a fixed frequency carrier signal such as a conventional 20 megacycle inductance-capacitance tuned oscillator.

The particular frequency of the carrier signal is not critical but should be at least several times higher than the highest modulating (video) frequency with which the microwave output power is to be modulated. On the other hand, the carrier signal frequency is selected to be as low as consistent with providing a suitable carrier signal for the modulating signal so that fixed frequency oscillator 11 and its modulation is simple and straight-forward. Carrier oscillator 11 is modulated by the modulating signal for modulating the microwave output power which is applied to its input terminal 25.

A modulating or control signal such as the step function shown at 26 is applied to input terminal 25 to amplitude modulate the carrier signal as shown at 27 whose envelope corresponds to the control signal. Because the carrier frequency is substantially below microwave frequency range, control signal 26 readily modulates carrier signal 27 without any appreciable delay of response or distortion.

Modulated carrier signal 27 is applied to bolometer 13 which develops a D.C. output voltage, as shown at 28, which follows the characteristic slow exponential response of bolometers. In this manner the modulating signal shown at 26 is converted into the relative slow and exponentially rising D.C. voltage shown at 28, the bolometer operating on the envelope as an integrator.

The D.C. voltage shown at 28 is applied to summing network 15 and summed with the feedback voltage from bolometer 23. As long as amplifier 17 is selected to be broadband with respect to the modulating signal and to have a very high-gain, its response is substantially instantaneous as shown at 29. Therefore, microwave source 19 immediately starts increasing its output power level as shown at 30. If device 21 is selected as a conventional microwave coupler constructed for diverting a small fraction of the output power as a feedback signal to feedback conductor 22, the feedback signal amplitude increases proportionally with the output power. Bolometer 23, suitably connected as will be explained hereinafter, converts or integrates this sudden increase in output power into a slow and exponentially decreasing D.C. feedback voltage as shown at 31 in accordance with the transfer characteristics of bolometer 23.

As long as the loop gain, that is the gain of amplifier 17, is very high and the bandwidth of amplifier 17 is sufficiently great to accommodate the modulating or control signal 26, the time response of the system shown in FIG. 1 is reduced to a negligible amount. This can be understood by considering the following. Modulation signal 26 is placed upon carrier signal 27 without any substantial delay and applied to bolometer 13 which immediately starts to increase its output voltage. Almost instantaneously this increased voltage, via summing network 15, is applied to amplifier 17, which because of its high-gain amplifies the same many times to almost instantaneously increase the output power level of device 19.

Instantaneously a fraction of the increased output power is applied to bolometer 23 which immediately increases its output voltage (of negative polarity) and applies the same to summing network 15. All this takes place long before output voltage 28 rises to the value reflecting the modulation signal so that the time response of either bolometer does not appreciably affect the time response of the system.

To assure that the output power level of microwave signal 30 faithfully follows modulating signal 26 without distortion, bolometers 13 and 23 are carefully matched to have the same or very similar transfer function so that as long as the sum of output voltages 28 and 31 is zero, signals 27 and 30 have the same relationship to one another. It is also desirable to place both bolometers 13 and 23 into a thermal enclosure, side by side, so that any ambient temperature change is suffered by both to the same extent.

Referring now to FIG. 2 there is shown the modulating system of this invention being applied to control or modulate the output power delivered to output conductor 40 by a backward travelling wave tube oscillator 41 in accordance with a control or modulating signal applied to control input terminal 42. Control input terminal 42 is connected to modulate a fixed frequency carrier oscillator 43 having a frequency at least five times greater than the modulating signal which applies its modulated carrier signal, via lead 44 and isolation capacitor 57, to a bolometer 45. The output terminal of bolometer 45 is also connected via a carrier frequency filter comprising an inductive impedance 46 and a grounded capacitive impedance 47 to input terminal 48 of a summing network 49.

Summing network 49 is connected, by output lead 50, to a conventional wideband high-gain amplifier 51 which applies its output signal, via lead 52, to the beam density control terminal of microwave oscillator 41. The microwave output power from oscillator 41 is connected, via waveguide or coaxial cable 53, to a conventional coupler 54. Coupler 54 is connected to output waveguide 40 and to feedback waveguide 55 diverting to the latter a small fixed percentage of the output power delivered to guide 40. A capacitive impedance 56 is inserted into feedback waveguide 55 to provide D.C. isolation between oscillator 41 and bolometer 58. Feedback waveguide 55 applies its microwave signal to the center terminal of a bolometer 58. Bolometer 58 has its output terminal 63 connected, via lead 59, directly to input terminal 60 of summing network 49 via grounded high frequency bypass capacitive impedance 61.

Bolometers 45 and 58 have applied respectively to terminals 62 and 63, in the conventional manner, suitable D.C. biasing voltage as is well known to those skilled in the art. In case network 49 is a summing device, the biasing voltage applied to bolometers 45 and 58 are of opposite polarity. To assure that bolometers 45 and 58 have the same operating characteristics at the same time, they are not only carefully matched but are also encapsulated or enclosed into a thermal enclosure 64, side-by-side, to insure exposure to the same ambient temperature. Of course, instead of utilizing a summing network, a difference network usually forming part of the amplifier may be employed in which case biasing voltages of the same polarity may be used.

In operation, the D.C. voltages developed by bolometers 45 and 58 are respectively applied to summing network input terminals 48 and 60, their difference amplified and applied to microwave tube 41. More particularly, the control signal applied to input terminal 42 modulates the carrier signal of fixed frequency oscillator 43 which in turn produces a change in the temperature and thereby resistance of bolometer 45. This change of resistance causes a change of current and therefore a corresponding change of the output voltage at terminal 62 which is applied to summing input terminal 48. In accordance with this change of output voltage a corresponding signal is applied, via amplifier 51, to oscillator 41 which in turn changes the output power.

A D.C. voltage corresponding to the changed output power is applied, via waveguide 55, to bolometer 58 which changes its temperature and thereby its resistance in response thereto. This change in resistance of bolometer 58 causes a change of current flow from terminal 63 to ground and a corresponding change of potential which is applied via lead 59 to summing input terminal 60 as explained in connection with the description of FIG. 1. As long as the characteristics of bolometers 45 and 58 are the same, the response of the system is substantially distortionless and free of overshoot. Also, if the gain of amplifier 51 is high, the response time is negligible.

Since the output power level of microwave tube 41 in the system of this invention faithfully follows the envelope of modulated carrier signal on lead 44, a power level indicator 66, connected to lead 44 through a crystal rectifier 67 provides a convenient means of measuring the power level. Such an arrangement for power level measurement has a number of advantages over measuring the output power level of the microwave output power directly. The power level is lower by the fixed percentage fed by the directional coupler into the feedback loop. The carrier signal is of fixed frequency so that the crystal need not be carefully matched. Also the frequency of the carrier signal is much lower resulting in further simplification.

Referring now to FIG. 3 there is shown a system useful for measuring the output power level from any microwave device and for observing the modulation envelope of the output power. To this end, the microwave device under test is connected to the center tap of a bolometer 76 through a D.C. isolation capacitive impedance 74. Bolometer 76 is suitably biased and in response to the applied microwave signal provides an output voltage which reflects the output power level as modified by its transfer characteristic.

Also provided is a feedback system including a summing network 82, a wideband, high-gain amplifier 85, a fixed frequency carrier oscillator which can be externally modulated, and a feedback bolometer 78.

Summing network 82 applies its output voltage, via lead 84, to a wideband high-gain amplifier 85 which in turn is connected to the amplitude control terminal of fixed frequency oscillator 86 which is selected to provide an output signal having a frequency in accordance with the criteria explained hereinbefore. The modulated carrier signal from oscillator 86 is applied, via D.C. isolation capacitive impedance 73, to bolometer 78 in the conventional manner. To assure that the carrier frequencies do not pass to summing network 82 an inductance filter or choke 88 is inserted into lead 83 which connects bolometer 78 to summing network 82.

Finally, bolometer 76 has its output lead 81 connected to the other input terminal of summing network 82. As before, bolometers 76 and 78 are biased with potentials of opposite polarity so that the output voltages of the bolometer are of opposite polarity. Also, bolometers 76 and 78 are carefully matched so that their transfer functions are substantially identical and are placed for exposure to the same ambient temperature by encapsulating them side by side in a thermal enclosure 94.

Feedback lead 87 is also connected, via a suitable rectifier means 91, to a power level indicator 92 for indicating the amplitude of the modulated carrier signal to thereby provide a convenient means of measuring output power level. Since as previously explained, the carriage signal envelope is proportional to the microwave power output level, the arrangement of FIG. 3 provides a convenient method of measuring power output at a fixed frequency. A lead 93 may be connected to the output of amplifier 84 (or output of oscillator 86) to provide a convenient point in the circuit at which the modulation envelope of the microwave output power may be observed.

In operation of this invention, microwave output power level is transduced or converted by bolometer 76 into a D.C. voltage in accordance with the transfer characteristic of bolometer 76. This D.C. voltage is applied, as input quantity, to a feedback system which in response thereto increases the power output of carrier oscillator 86. The power output level from carrier oscillator 86, upon being applied to bolometer 78, is similarly transduced into a D.C. voltage in accordance with the transfer characteristic of bolometer 78. Both transduced output voltages are applied to amplifier 85 and balance is reached instantaneously whereby the modulated carrier signal follows the microwave output level.

As long as bolometers 76 and 78 have the same characteristics, any change in microwave output power will be instantaneously observable and measurable in spite of the slow response of the individual bolometer, as has been explained in connection with the description of FIG. 1. Also, the amount of feedback signal in feedback path 87 is directly proportional to the output power of microwave device 70 which is measured by meter 92 or by oscilloscope connected to lead 93. Accordingly, if meter 92 is properly calibrated it will provide an indication of the output power level at all times.

Figure 4:
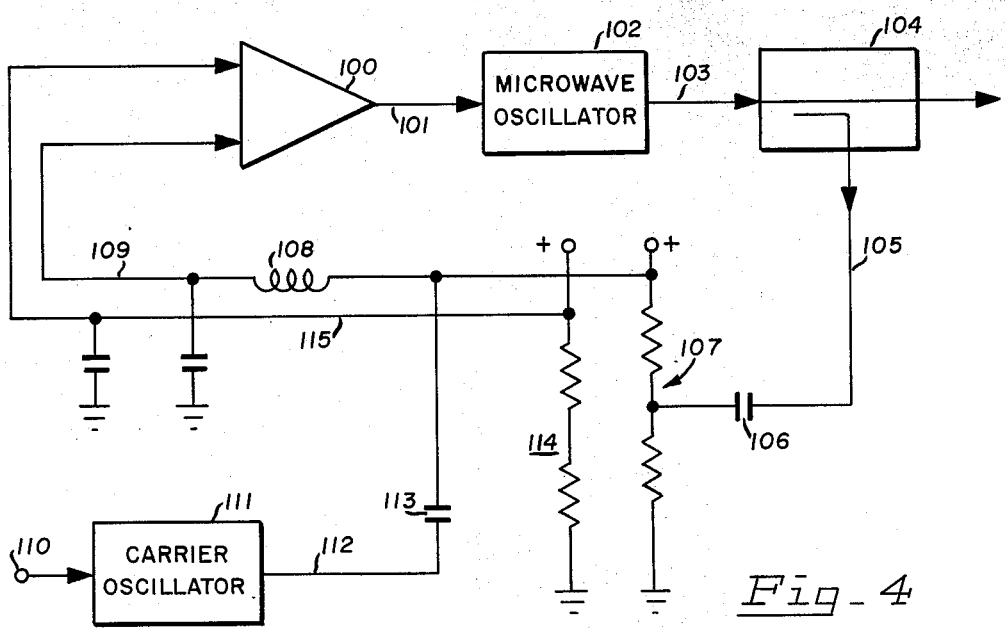
FIG. 4 is a schematic circuit diagram, partially in block form, of an alternate embodiment for modulating a microwave oscillator.

The arrangement shown in FIG. 4 is an alternate embodiment of the modulating system of FIG. 2, the main difference being that a single bolometer is utilized to develop both the input and the feedback voltage to the system. More particularly, a broadband high-gain amplifier is connected, via lead 101, to the amplitude control terminal of a microwave oscillator. Microwave output power is applied via output conductor 103 through a microwave coupler 104 to a utilization device (not shown). Coupler 104 diverts a fixed percentage of the output power via conductor 105 and D.C. isolation capacitive impedances 106 to bolometer 107 suitably biased. The output voltage developed by bolometer 107 is fed back to the input terminal of amplifier 100 through feedback path 109 and choke 108 which provides isolation to high frequency signals.

A modulating signal is applied to input terminal 110 of a fixed frequency carrier oscillator 111 having an output signal whose frequency is at least five times higher than the highest modulating frequency. The amplitude modulated carrier signal is applied to bolometer 107. To provide ambient temperature compensation, a second bolometer 114 is provided and connected to the other terminal of amplifier 100 which derives the difference signal of the two input voltages to assure that external temperature changes do not cause erroneous amplitude changes of the microwave output power. To assure that both bolometers 107 and 114 operate at the same or a fixed different temperature, they are placed side by side into a thermal enclosure.

In operation, a change in the modulating signal applied to terminal 110 will produce a change in amplitude of the modulated carrier signal which in turn causes a change in the output voltage of bolometer 107. This change in output voltage is amplified by amplifier 100 and the amplified change of output voltage is applied to microwave oscillator 102 which changes its output level in the opposite direction, i.e., if the modulating signal increases, the microwave power output level decreases. This change of output power as applied to bolometer 107 changes the output voltage in the opposite direction so as to reduce the change to zero.

As long as the gain of amplifier 100 is high, and in accordance with the theory of operation explained in connection with the description of FIG. 1, the time response of the loop is negligible and response is instantaneous. Since application of the carrier signal and microwave signal to the same bolometer does not decrease the number of bolometers used (two being required for ambient temperature control) the main advantage resides in transducing both signals with the same transducer and obviating the necessity for carefully matched pairs. On the other hand, if the amplitude range of the modulating signal is sufficiently great to drive the microwave tube to below cut-off or to have saturation, then certain advantages are obtained by utilizing separate bolometers. One of the advantages is the avoidance of the slow response during the inoperative period of the microwave tube since with the use of separate bolometers the response time becomes negligible when both oscillators operate in the linear region.

There has been described hereinabove a method and a system for modulating and for measuring the power output level of microwave devices utilizing two relatively slow bolometers having matched response characteristics and encapsulated side by side for exposure to the same ambient temperature. The response of the system is practically instantaneous as long as high-gain amplifiers are utilized even though the response of the individual bolometers are slow, and compares favorably with the conventional method of utilizing a crystal as transducing element in the feed-back path.

What is claimed is:

1. A system for modulating the output power of a microwave device with a modulation signal comprising:
    (a) means for modulating a fixed frequency signal with said modulation signal to develop a modulated fixed frequency signal;
    (b) first means for demodulating said modulated fixed frequency signal to derive a first demodulated signal which corresponds to the envelope of said fixed frequency signal as modified by the transistor characteristic of said first means;
    (c) means for diverting a fixed portion of the output power of said microwave device to derive a microwave feedback signal;
    (d) second means for demodulating said feedback signal to derive a second demodulated signal which corresponds to the output power as modified by the transfer characteristic of said second means;
    (e) means for developing an error signal commensurate with the difference between said first and second demodulated signals;
    (f) means for amplifying said error signal; and
    (g) means for applying said amplified error signal to said microwave device to control its output power.

2. A system for modulating the output power of a microwave device with a modulation signal comprising:
    (a) means for modulating a fixed frequency signal having a frequency substantially higher than the frequency of said modulating signal with said modulation signal to develop a modulated fixed frequency signal;
    (b) first means for demodulating said modulated fixed frequency signal to derive a first demodulated signal which corresponds to the modulation signal as modified by the transfer characteristic of said first means;
    (c) means for utilizing a fixed portion of the output power of the microwave device whose output power is to be modulated to derive a microwave frequency feedback signal;
    (d) second means for demodulating said feedback signal to derive a second demodulated signal which corresponds to the output power as modified by the transfer characteristic of said second means;
    (e) means for summing said first and said second demodulated signals to derive a difference signal which corresponds to the difference between their respective instantaneous amplitudes;
    (f) means for amplifying said difference signal; and
    (g) means for applying said amplified difference signal to said microwave device to control its output power.

3. A system for modulating the output power of a microwave tube with a modulation signal comprising:
    (a) means for modulating a fixed frequency signal source having a frequency substantially higher than the frequency of said modulation signal and substantially lower than the frequency of the microwave tube signal to be modulated to develop a modulated fixed frequency signal;
    (b) first means for demodulating said modulated fixed frequency signal to derive a first demodulated signal which corresponds to the modulation signal as modified by the transfer characteristic of said first means;
    (c) second means for demodulating having substantially the same transfer characteristic as said first means for demodulating a fixed portion of the output power of said microwave tube to derive a second demodulated signal which corresponds to said output power as modified by the transfer characteristic of said second means;
    (d) means for summing said first and said second demodulated signals to derive an error signal which corresponds to the difference between their respective instantaneous amplitudes;
    (e) means for amplifying said error signal; and
    (f) means for applying said amplified error signal to said microwave tube to control its output power.

4. A system for modulating the output power of a microwave tube with a modulation signal comprising:
    (a) means for modulating a fixed frequency carrier signal source having a frequency substantially higher than the frequency of said modulation signal to develop a modulated carrier signal;
    (b) first means for demodulating said modulated carrier signal to derive a first demodulated signal which corresponds to the modulation signal as modified by the transfer characteristic of said first means;
    (c) second means for demodulating having substantially the same transfer characteristic and being maintained at the same temperature as said first means, for demodulating a fixed portion of the output power of said microwave tube to derive a second demodulated signal which corresponds to the output power as modified by the transfer characteristic of said second means;

(d) means for summing said first and said second demodulated signals to derive an error signal corresponding to the difference of their instantaneous amplitudes;
(e) means for amplifying said error signal; and
(f) means for applying said amplified error signal to said microwave tube to control its output power.

5. A system for modulating the output power of a microwave device with a modulation signal comprising:
(a) means for modulating a fixed frequency carrier signal having a frequency substantially higher than the frequency of said modulating signal with said modulation signal to develop a modulated carrier signal;
(b) means for utilizing a fixed portion of the output power of said microwave device to derive a microwave frequency feedback signal;
(c) means for demodulating said modulated carrier signal and said feedback signal to derive a demodulated difference signal which corresponds to the difference between the envelopes of said modulated carrier signal and said feedback signal as modified by the transfer characteristic of said means for demodulating;
(d) means for amplifying said demodulated difference signal; and
(e) means for applying the amplified difference signal to said microwave device to control its output power.

6. A system for measuring the output power level of a microwave device comprising:
(a) an externally modulatory fixed frequency carrier oscillator;
(b) means for demodulating the output signal from said externally modulatory carrier oscillator and the output signal from said microwave device to derive a difference signal which corresponds to the difference between the modulation envelopes of the applied signals as modified by the transfer characteristic of said means for demodulating;
(c) means for amplifying said difference signal;
(d) means for utilizing said amplified difference signal to modulate said carrier oscillator; and
(e) means for measuring the amplitude of the output signal of said carrier oscillator which corresponds to the power output level of said microwave device.

7. A system for measuring the output power level of a microwave device comprising:
(a) first means for demodulating the output power from said microwave device to derive a first demodulated signal which corresponds to the amplitude of said output power as modified by the transfer characteristic of said first means;
(b) an externally modulatory fixed frequency carrier signal source to provide a carrier signal;
(c) second means for demodulating, having substantially the same transfer characteristic as said first means, for demodulating said carrier signal to derive a second demodulated signal which corresponds to the amplitude of said carrier signal as modified by the transfer characteristic of said second means;
(d) means for summing said first and said second transduced signals to derive an error signal corresponding to the difference of their instantaneous amplitude;
(e) means for amplifying said error signal;
(f) means for modulating said carrier signal source with said amplified error signal; and
(g) means for measuring the amplitude of said modulated carrier signal which corresponds to the power output level of said microwave device.

8. A system for measuring the output power level of a modulated microwave device comprising:
(a) first means for demodulating a fixed portion of the output power of said microwave device to derive a first demodulated signal which corresponds to said output power level as modified by the transfer characteristic of said first means;
(b) an externally modulatory fixed frequency carrier oscillator for providing a carrier signal having a frequency substantially higher than the highest modulating frequency with which the output power of said microwave device is modulated;
(c) second means for demodulating having substantially the same transfer characteristics and being maintained at substantially the same temperature as said first means, for demodulating said carrier signal to derive a second demodulated signal which corresponds to the amplitude of the said carrier signal as modified by the transfer characteristic of said second means;
(d) means for summing said first and said second transduced signals to derive an error signal corresponding to the difference of their instantaneous amplitudes;
(e) means for amplifying said error signal;
(f) means for utilizing said amplified error signal to modulate said carrier oscillator; and
(g) means for measuring the amplitude of the modulated carrier signal which corresponds to the power output of said microwave device.

9. A system for modulating the output power of a microwave device with a modulating signal, said system comprising:
(a) carrier oscillator means responsive to said modulating signal and operative to provide an amplitude modulated carrier signal;
(b) first bolometer transducer means responsive to said amplitude modulated carrier signal for developing a first transduced signal;
(c) a microwave oscillator responsive to an amplified error signal for providing an output power level corresponding to said modulating signal;
(d) second bolometer transducer means responsive to the output signal from said microwave oscillator for developing a second transduced signal;
(e) means responsive to said first and second transduced signals for deriving an error signal corresponding to the instantaneous difference between said transduced signals; and
(f) wideband highgain amplifier means responsive to said error signal for deriving said amplified error signal.

10. A system for modulating the output power of a microwave oscillator with a modulating signal, said system comprising:
(a) fixed frequency carrier oscillator means responsive to said modulating signal and operative to provide an amplitude modulated carrier signal, the frequency of said carrier signal being selected to be at least five times higher than the highest frequency of said modulating signal;
(b) first bolometer transducer means responsive to said amplitude modulated carrier signal for developing a first transduced signal which corresponds to said modulated carrier signal modified by the transfer characteristic of said first transducer means;
(c) a microwave oscillator responsive to an amplified error signal for providing output power corresponding to said modulating signal;
(d) second bolometer transducer means responsive to a fixed percentage of said output power for developing a second transduced signal which corresponds to said output power modified by the transfer characteristic of said second transducer means;
(e) summing means responsive to said first and said second transduced signals for deriving an error signal commensurate with the difference between said first and second transduced signals; and
(f) amplifier means responsive to said error signal for deriving said amplified error signal.

11. A system for modulating the output power of a microwave device with a modulating signal, said system comprising;

(a) fixed frequency carrier oscillator means responsive to said modulating signal and operative to provide an amplitude modulated carrier signal having a frequency substantially higher than the highest frequency of said modulating signal;

(b) first bolometer transducer means responsive to said amplitude modulated carrier signal for developing a first transduced signal in accordance with its transfer characteristic;

(c) an externally modulatory microwave device responsive to an amplified error signal for providing output power corresponding to said modulating signal;

(d) second bolometer transducer means responsive to a selected portion of said output power for developing a second transduced signal in accordance with its transfer characteristic, said first and second transducer means being selected to have substantially the same transfer characteristics and being placed for exposure to substantially the same ambient temperature;

(e) means responsive to said first and said second transduced signals for deriving an error signal corresponding to their instantaneous amplitude difference; and (f) amplifier means responsive to said error signal for deriving said amplified error signal.

12. A system for modulating the output power of a microwave device with a modulating signal, said system comprising;

(a) carrier oscillator means responsive to said modulating signal and operative to provide an amplitude modulated carrier signal;

(b) an externally modulatory microwave oscillator responsive to an amplified transduced signal to provide a microwave signal having an output power level corresponding to said modulating signal;

(c) bolometer transducer means responsive to said amplitude modulated carrier signal and said microwave signal for developing a transduced signal corresponding to the difference therebetween as modified by the transfer characteristic of said transducer means; and (d) amplifier means responsive to said transduced signal for deriving said amplified transduced signal for modulating said microwave oscillator.

13. A system for measuring the modulated output power of a microwave device comprising;

(a) first bolometer transducer means responsive to said modulated output power for developing a first transduced signal;

(b) fixed frequency carrier oscillator means responsive to an amplified error signal for providing an amplitude modulated carrier signal having a frequency substantially higher than the highest modulating frequency of said modulated output power;

(c) second bolometer transducer means responsive to said amplitude modulated carrier signal for developing a second transduced signal;

(d) means responsive to said first and said second transduced signal for deriving an error signal corresponding to their instantaneous amplitude difference;

(e) wideband amplifier means responsive to said error signal to derive said amplified error signal; and (f) means for measuring the amplitude of said amplitude modulated carrier signal which corresponds at all times to the modulated output power of said microwave device.

14. A system for measuring the output power level of a microwave frequency source comprising;

(a) first bolometer transducer means responsive to the output signal from said microwave frequency source for developing a first transduced signal which corresponds to the envelope of said output power level modified by the transfer characteristic of said first transducer means;

(b) fixed frequency video oscillator means responsive to an amplified error signal for providing an amplitude modulated video signal;

(c) second bolometer transducer means responsive to said amplitude modulated video signal for developing a second transduced signal which corresponds to the envelope of said amplitude modulated video signal modified by the transfer characteristic of said second transducer means, said first and second transducer means being selected to have substantially the same transfer characteristic and being placed to be exposed to substantially the same ambient temperature;

(d) means responsive to said first and said second transduced signals for deriving an error signal corresponding to their difference;

(e) amplifier means responsive to said error signal to derive said amplified error signal; and (f) means for measuring the amplitude of said amplitude modulated video signal which at all times corresponds to the output power of said microwave frequency source.

No references cited.